United States Patent [19]
Fink, Jr. et al.

[11] 3,766,457
[45] Oct. 16, 1973

[54] SPEED RESPONSIVE MOTOR STARTING SYSTEM

[75] Inventors: Leon Fink, Jr., Arlington; David C. Fricker, Hurst; Larry D. Thompson, Arlington, all of Tex.

[73] Assignee: ECC Corporation, Euless, Tex.

[22] Filed: Mar. 12, 1971

[21] Appl. No.: 123,737

[52] U.S. Cl. ......... 318/221 E, 318/221 G, 318/227
[51] Int. Cl. ............................................. H02p 1/44
[58] Field of Search ................. 318/220 R, 221 R, 318/221 E, 221 G, 227

[56] References Cited
UNITED STATES PATENTS

| | | | |
|---|---|---|---|
| 3,376,484 | 4/1968 | Lewus | 318/221 E |
| 3,586,939 | 6/1968 | Buiting et al. | 318/221 E |
| 3,414,789 | 12/1968 | Prouty | 318/221 E |
| 3,573,579 | 1/1970 | Lewus | 318/221 E |

Primary Examiner—Gene Z. Rubinson
Attorney—Giles C. Clegg, Jr., Jack A. Kanz and Richard E. Bee

[57] ABSTRACT

An electronic switching circuit for controlling the start operation of a single phase induction motor in accordance with the speed of the motor. A bilateral solid state switching device is connected in series with the motor starting reactance for activating and disabling same. A current-sensing element is coupled in circuit with the motor run winding for controlling the operation of a reed relay. When closed, the reed relay passes gating current to the solid state switching device for enabling activation of the motor starting reactance.

15 Claims, 4 Drawing Figures

INVENTORS
LEON FINK, JR.
DAVID C. FRICKER
LARRY D. THOMPSON

ATTORNEYS

SPEED RESPONSIVE MOTOR STARTING SYSTEM

BACKGROUND OF THE INVENTION

This invention relates to motor starting circuits and, more particularly, to motor starting circuits especially adapted for use in the starting of single phase induction motors.

Single phase induction motors and the operation thereof are well known in the art. Such motors are generally classified according to the type of starting mechanism used. For example, typical motors are referred to as split phase, capacitor start/capacitor run, capacitor start/inductor run, and the like. Typically, appropriate alternating-current line voltage is applied across the run winding of a single phase induction motor and a branch circuit containing a starting reactance is utilized to produce starting torque. After the motor has been started and a suitable operating speed reached, the branch circuit containing the starting reactance is disconnected from the line voltage. Thereafter, the motor continues to run with the necessary torque being provided by the run winding.

In the past, the starting reactance has usually been connected and disconnected by means of either a mechanical switch operated by centrifugal force or a mechanical switch operated by a relay type solenoid. Each of these disconnect methods is characterized by inherent difficulties relating to size, reliability and operational tolerance.

More recently, solid state switching devices have been proposed for use as motor starting switches. In certain ones of the proposed circuits, operation of the solid state switching device is controlled as a function of time. In others, different motor parameters, such as the amount of current flowing through the run winding, is used to control the solid state switching device so as to disconnect the starting reactance after the motor has attained a desired speed. Generally, it is preferred that the starting reactance be disconnected after the motor has attained a desired speed, rather than depending upon a predetermined time delay. Unfortunately, however, the sensing of the desired motor speed without adversely affecting the motor characteristics has proved difficult.

In a typical speed responsive solid state system of the type heretofore proposed, a bilateral solid state switching device is connected in series with the starting reactance and a current-sensing resistor is connected in series with the run winding of the motor, the current-sensing resistor being connected to the gate electrode of the solid state switching device for controlling same for enabling line current to flow through the starting reactance when the motor speed is below the desired value. Circuits of this type, however, suffer from various disadvantages. For one thing, the alternating-current voltage appearing across the current-sensing resistor will be lagging in phase relative to the alternating-current line voltage being applied across the starting reactance and solid state switching device. As a result, the switching device will not immediately commence conduction at the beginning of each half cycle of the line voltage. Instead, there will be a time lag caused by the lag in triggering of the switching device. Consequently, the current flow through the starting reactance will have a waveform characterized by a zero level notch immediately following the beginning of each half cycle. The presence of such notches results in a decrease in the effective power supplied to the starting reactance, thus reducing the starting torque applied to the motor.

Another disadvantage of solid state starting circuits of the foregoing type is that a small significant voltage must be produced across the current-sensing resistor in order to produce sufficient gate drive to cause the solid state switching device to switch to its low impedance state. To accomplish this, the current-sensing resistor must possess a certain minimum amount of resistance. The power dissipated in this resistance is, however, wasted and produces no useful result after the motor has started and the starting reactance has been disconnected.

It is an object of the invention, therefore, to provide a new and improved speed responsive motor starting system which employs an electrically-controllable solid state switching device and which enables a fuller realization of the maximum starting torque capability of the motor.

It is another object of the invention to provide a new and improved speed responsive motor starting system which employs an electrically-controllable solid state switching device and which minimizes the resistance introduced in circuit with the motor run winding.

For a better understanding of the present invention, together with other and further objects and features thereof, reference is had to the following description taken in connection with the accompanying drawing, the scope of the invention being pointed out in the appended claims.

BRIEF DESCRIPTION OF THE DRAWING

Referring to the drawing.

DESCRIPTION OF THE ILLUSTRATED EMBODIMENTS

Figure 1:
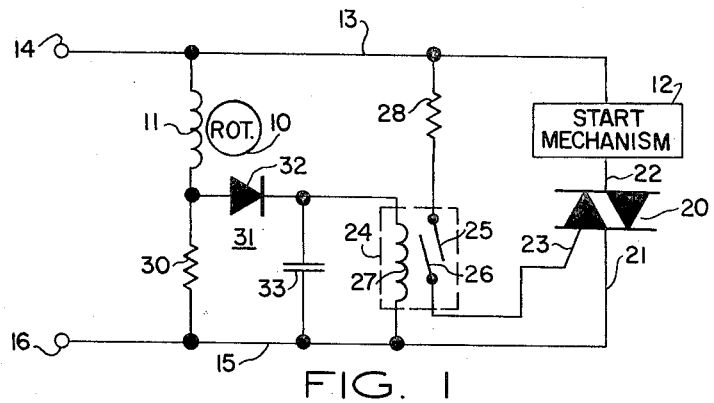
FIG. 1 is a schematic circuit diagram illustrating one embodiment of the present invention.

Referring to FIG. 1 there is shown a single phase alternating-current induction motor which includes a rotor 10, a run winding 11 and a starting mechanism 12. Run winding 11 and start mechanism 12 are located in parallel circuit branches which are connected between a pair of supply circuit means adapted to be individually connected to different sides of an electrical power source. A first of these supply circuit means includes a power supply conductor 13 having a power supply terminal 14 at one end thereof. The second of these supply circuit means includes a second power supply conductor 15 having a power supply terminal 16 at one end thereof. In use, terminals 14 and 16 are connected to different sides of an electrical power source such as, for example, a two-wire alternating-current power line. Start mechanism 12 includes the appropriate starting reactance for initially starting rotation of the rotor 10. Such starting reactance may be, for example, of the split phase type, the capacitor start/capacitor run type or the capacitor start/inductor run type.

Connected in series with the start mechanism 12 is a bilateral alternating-current semiconductor switching device 20 having a pair of power electrodes 21 and 22 and a control or gate electrode 23. For sake of convenience, the power electrode 21 located on the same side of the device 20 as the gate electrode 23 will be referred to as the cathode, while the other power electrode 22 will be referred to as the anode. The switching device 20 is connected in series with the start mechanism 12 by means of its power electrodes 21 and 22, the anode 22 being connected to the start mechanism 12 and the cathode 21 being connected to the lower power supply conductor 15.

When the gating current supplied to the gate electrode 23 exceeds a predetermined trigger level set by the internal characteristics of the device 20, the device 20 is conditioned to conduct current from one power electrode to the other whenever the voltage across the power electrodes exceeds a certain minimum value. Such power electrode current may flow from the cathode 21 to the anode 22 or vice versa, depending upon the polarity of the voltage across the power electrodes. When in such conductive condition, the impedance between power electrodes 21 and 22 is of a very low value. When, on the other hand, the gating current supplied to the gate electrode 23 is less than the predetermined trigger level, the device 20 remains nonconductive and the impedance between the power electrodes 21 and 22 is relatively high. The device 20 will switch to the conductive mode for either positive or negative polarity gating current at the gate electrode 23, provided the amplitude of such current is above the trigger level.

The motor starting system of FIG. 1 further includes relay means, represented by a reed relay 24, having contact means, represented by reed elements 25 and 26, and a control winding 27 for controlling the opening and closing of the reed elements 25 and 26. Reed elements 25 and 26 are located within an evacuated glass vial (not shown) and the control winding 27 is wound around the outside thereof in the usual manner. The relay means represented by reed relay 24 must be a highly sensitive device requiring only a small amount of current to operate same. Such relay means must also possess a very high degree of reliability such that it can undergo tens of thousands of closures without becoming defective. In the present state of the art, a reed relay is the only device possessing these necessary characteristics. It may be, of course, that at some future date an even better form of relay device may be invented, in which case, such device can be used in place of the reed relay 24.

The contact elements 25 and 26 of the reed relay 24 are connected in circuit with the gate electrode 23 of the switching device 20 for supplying gating current thereto when the contact elements 25 and 26 are closed. More particularly, the lower contact element 26 is connected directly to the gate electrode 23, while the upper contact element 25 is connected to the upper power supply conductor 13 by way of a current-limiting resistor 28.

The motor starting system also includes means responsive to current flowing through the motor run winding 11 for supplying control current to the relay control winding 27. This circuit means includes a current-sensing resistor 30 connected in series with the motor run winding 11. Resistor 30 has a very low value of resistance on the order of a few tenths of an ohm. In the FIG. 1 embodiment, the means for supplying control current to the relay control winding 27 further includes rectifier circuit means 31 for supplying unidirectional control current to the relay winding 27. This rectifier circuit means 31 includes a diode 32 and a capacitor 33 connected in series across the current-sensing resistor 30. The capacitor 33 is, in turn, connected across the relay control winding 27.

Considering now the operation of the FIG. 1 embodiment, the magnitude of the current flowing through the motor run winding 11 varies inversely with the speed of rotation of the rotor 10. When rotor 10 is stationary, the current flow is faily heavy. As the rotor 10 picks up speed, the current flow decreases. Current-sensing resistor 30 develops thereacross a voltage drop which is proportional to the magnitude of the run winding current. This alternating-current voltage drop across resistor 30 is rectified by the diode 32 and smoothed by the capacitor 33 to develop across the capacitor 33 a unidirectional or direct-current voltage having a magnitude which is proportional to the run winding current. When the voltage across capacitor 33 reaches a certain level, the energizing current flowing through the relay control winding 27 becomes sufficient to cause the reed elements 25 and 26 to move into contact with one another. The reed elements 25 and 26 remain closed in this manner so long as the voltage across capacitor 33 exceeds the relay opening level. With reed relays, this opening level voltage is typically a volt or two less than the voltage level initially required to close the relay contacts 25 and 26. These opening and closing levels are determined by the characteristics of the reed relay 24.

When relay contacts 25 and 26 are closed, gating current flows from the upper power supply conductor 13, through the resistor 28, the closed reed elements 25 and 26, through the internal portion of the switching device 20 intermediate the gate electrode 23 and the cathode 21 and to the lower power supply conductor 15 during one half cycle of the alternating-current line voltage. During the next half cycle, the direction of the current flow in this gate electrode circuit is reversed. As mentioned earlier, either polarity or direction of current flow in the gate electrode circuit is sufficient to trigger the switching device 20 so long as the current amplitude is above the trigger level. The value of resistor 28 is selected so that the gating current exceeds this trigger level for practically the entire time during each half cycle.

There is, of course, a short interval at the beginning of each half cycle during which the gating current is below the trigger level. The circuit is contructed so as to keep this time interval from delaying the triggering of the device 20. This is accomplished by making the amplitude and the phase angle of the gating current relative to the line voltage applied across the power electrodes 21 and 22 such that the gating current amplitude is greater than the trigger level at or very immediately after the line voltage crosses the zero axis. In other words, the gate current amplitude is caused to exceed the trigger level at or before the instant the power electrode voltage exceeds the value required to cause current flow between the power electrodes 21 and 22. Thus, when the reed elements 25 and 26 are closed together, the switching device 20 is conductive practically the entire time and current flows through the start mechanism 12 in very nearly the same manner as if the lower side of the start mechanism were connected directly to the lower power supply conductor 15.

The flow of current through the start mechanism 12 provides the initial starting torque for initiating rotation of the rotor 10. As the rotor speed continues to increase, a point is soon reached when the voltage drop across the current-sensing resistor 30 is insufficient to keep the reed elements 25 and 26 closed. Consequently, such elements open. This discontinues the flow of gating current to the gate electrode 23 which, in turn, renders the switching device 30 non-conductive for the remainder of the time. This turns off and disables the current flow through the start mechanism 12. After this point is reached, the torque for driving the rotor 10 is provided by the run winding 11.

The FIG. 1 embodiment offers several advantages over the heretofore proposed solid state system described above. For one thing, the so-called notch effect is considerably reduced. This occurs because the gating current for the switching device 20 is derived directly from the power supply conductors 13 and 15 by means of a circuit which contains no appreciable inductive reactance. Consequently, the undesirable phase lag between the gating current and the voltage applied across the power electrodes 21 and 22 is eliminated. This keeps the small dead time interval for the device 20 at the beginning of each half cycle to a minimum. Thus, a fuller realization of the maximum starting torque capability of the motor is achieved.

Another advantage results from the highly sensitive nature of the reed relay 24. Because of such sensitivity, less driving voltage is required to cause a closing of the relay contacts 25 and 26. Thus, current-sensing resistor 30 can have a lower value of resistance. This decreases the power dissipated in the resistor 30, which power dissipation serves no useful purpose and is wasted after the motor has started and the starting mechanism 12 has been disconnected.

A further advantage results from the hysteresis effect represented by the difference in opening and closing voltage levels for the reed relay 24. More particularly, since more voltage is required to initially close the reed elements 25 and 26 than to keep them closed, there is less likelihood of the start mechanism 12 being turned back on accidently once the rotor 10 has reached the desired minimum speed.

Figure 2:
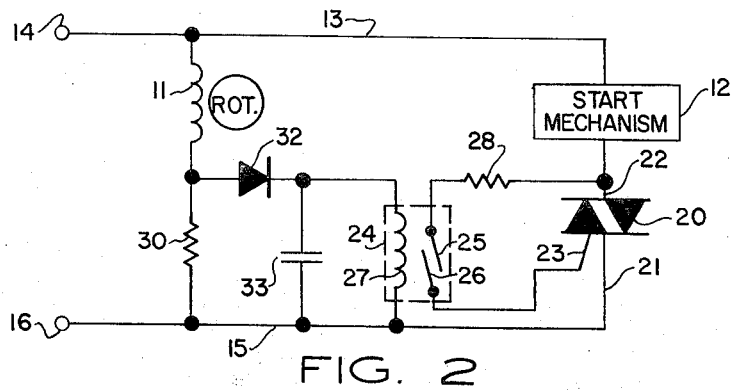
FIG. 2 is a schematic circuit diagram illustrating a second embodiment of the invention.

As indicated in the FIG. 2 embodiment, the current-limiting resistor 28 may be connected to the anode electrode 22 of the switching device 20 instead of to the upper power supply conductor 13. An advantage of this FIG. 2 connection is that when the switching device 20 is switched to its low impedance condition, the voltage appearing across the gate electrode circuit formed by resistor 28 and relay contacts 25 and 26 will be relatively small. This reduces the power dissipated in the resistor 28. In some instances, it is also practical in the FIG. 2 embodiment to omit the resistor 28 and instead connect the reed element 25 directly to the anode 22. This is because the switching characteristics of the switching device 20 are normally such that the device is switched from the high impedance state to the low impedance state in such an extremely short period of time that current surges through the reed elements 25 and 26 are practically non-existent.

Figure 3:
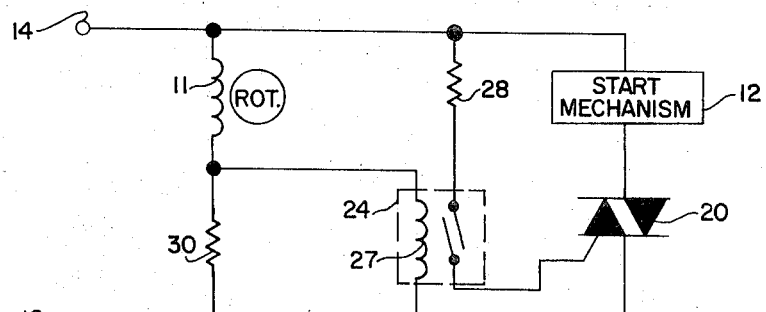
FIG. 3 is a schematic circuit diagram illustrating a third embodiment of the invention.

As indicated in the embodiment of FIG. 3, it is also practical in some cases to omit the rectifier circuit formed by diode 32 and capacitor 33 and to instead connect the relay control winding 27 directly across the current-sensing resistor 30. This will depend upon the characteristics of the particular type reed relay which is used. If such reed relay can be operated with alternating current without causing reed chatter, then the diode 32 and capacitor 33 can be eliminated.

Figure 4:
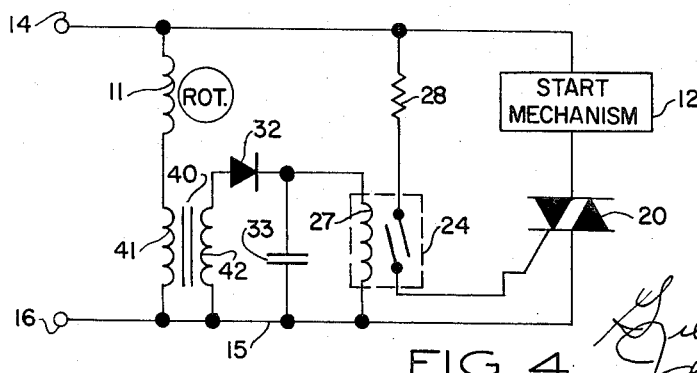
FIG. 4 is a schematic circuit diagram illustrating a fourth embodiment of the invention.

Referring to FIG. 4, there is shown the case where the current-sensing element coupled in circuit with the motor run winding 11 takes the form of a transformer mechanism. In the illustrated embodiment, this transformer mechanism comprises a current transformer 40 having a first winding 41 connected in series with the motor run winding 11 and a second or output winding 42 inductively coupled to the first winding 41. One side of the output winding 42 is connected to the rectifier diode 32, while the other side of the output winding 42 is connected to the lower power supply conductor 15. Current transformer 40 is constructed to provide a very, very low impedance in series with the motor run winding 11. Thus, the use of current transformer 40 serves to provide even less resistance in series with the motor run winding 11 than does the resistor 30 of the earlier embodiments. Thus, the undesired power dissipation is further reduced. On the other hand, a current transformer will normally cost somewhat more than a resistor. Consequently, the current transformer embodiment can be used to best advantage with higher horsepower motors where the saving in power loss will tend to offset the added cost of the current transformer.

Instead of using a current transformer in the manner shown in FIG. 4, it will sometimes be more feasible to use a modified form of current transformer wherein the primary winding 41 is omitted and the output winding 42 is instead placed in close physical proximity to the motor run winding 11 so as to be inductively coupled thereto. Thus, in terms of FIG. 4, winding 41 may be omitted and winding 42 wound alongside of some of the turns of run winding 11 and located therewith inside the motor housing.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A speed responsive motor starting system comprising:
   a. a motor including a run winding and a start mechanism;
   b. a bilateral switching device having a pair of power electrodes and a control electrode;
   c. relay means having contact means and a control winding for controlling the opening and closing of the contact means;
   d. means connecting the switching device by its power electrodes in series with the motor start mechanism;
   e. means connecting the relay contact means in circuit with the control electrode of the switching device for supplying gating current thereto when the relay contact means are closed; and, f. means responsive to current flowing through the motor run winding for supplying control current to the relay control winding.

2. A system as defined in claim 1 wherein the relay means comprises a reed relay.

3. A system as defined in claim 1 wherein the system includes a pair of supply circuit means adapted to be individually connected to different sides of an electrical power source and wherein one side of the relay contact means is coupled to one of the supply circuit means and the other side of the relay contact means is coupled to the control electrode of the switching device.

4. A system as defined in claim 3 wherein the relay contact circuit running from the supply circuit means to the control electrode includes a resistor in series therein.

5. A system as defined in claim 1 wherein one side of the relay contact means is coupled to one of the power electrodes of the switching device and the other side of the relay contact means is coupled to the control electrode of the switching device.

6. A system as defined in claim 5 wherein the relay contact circuit running from the power electrode to the control electrode includes a resistor in series therein.

7. A system as defined in claim 1 wherein the means for supplying control current to the relay control winding includes a current-sensing resistor connected in series with the motor run winding and circuit means connected between the current-sensing resistor and the relay control winding for supplying control current to the relay control winding.

8. A system as defined in claim 7 wherein the circuit means connected between the current-sensing resistor and the relay control winding comprises rectifier circuit means for supplying unidirectional control current to the relay control winding.

9. A system as defined in claim 8 wherein the rectifier circuit means comprises a diode and a capacitor connected in series across the current-sensing resistor and circuit means connecting the capacitor across the relay control winding.

10. A system as defined in claim 1 wherein the means for supplying control current to the relay control winding includes transformer means responsive to current flowing through the motor run winding and having an output winding for providing a signal indicative of such current flow and circuit means connected between the transformer output winding and the relay control winding for supplying control current to the relay control winding.

11. A system as defined in claim 10 wherein the circuit means connected between the transformer output winding and the relay control winding comprises rectifier circuit means for supplying unidirectional control current to the relay control winding.

12. A system as defined in claim 11 wherein the rectifier circuit means includes a diode and a capacitor connected in series across the transformer output winding and circuit means connecting the capacitor across the relay control winding.

13. A system as defined in claim 1 wherein the means for supplying control current to the relay control winding includes a current transformer having a first winding connected in series with the motor run winding and a second winding inductively coupled to the first winding and circuit means connected between the second transformer winding and the relay control winding for supplying control current to the relay control winding.

14. A system as defined in claim 13 wherein the circuit means connected between the second transformer winding and the relay control winding comprises rectifier circuit means for supplying unidirectional control current to the relay control winding.

15. A system as defined in claim 14 wherein the rectifier circuit means includes a diode and a capacitor connected in series across the second transformer winding and circuit means connecting the capacitor across the relay control winding.

* * * * *